Nov. 21, 1967  F. BUTHENHOFF  3,353,374

UNIVERSAL JOINT

Filed March 10, 1966

INVENTOR
FRIEDRICH BUTHENHOFF

BY *Dicker + Craig*
ATTORNEYS 3,353,374
UNIVERSAL JOINT
Friedrich Buthenhoff, Hawthorn, Melbourne, Victoria, Australia, assignor to Maybach Motorenbau G.m.b.H., Friedrichshafen, Germany
Filed Mar. 10, 1966, Ser. No. 533,152
Claims priority, application Germany, Mar. 17, 1965, M 64,555
4 Claims. (Cl. 64—17)

ABSTRACT OF THE DISCLOSURE

For use in a universal joint, a cross structure having four bearing pins mutually disposed at right angles which are each provided with a lubricating bore that cross each other preferably in the center axis of the cross structure; a supply bore for supplying lubricant to the lubricating bores is also provided in the cross structure preferably also in the center axis thereof; the supply bore as well as the four lubricating bores are valved by a piston-like valve member, normally urged in the closure position by a spring in which it closes the four lubricating bores with respect to each other.

---

Figure 1:
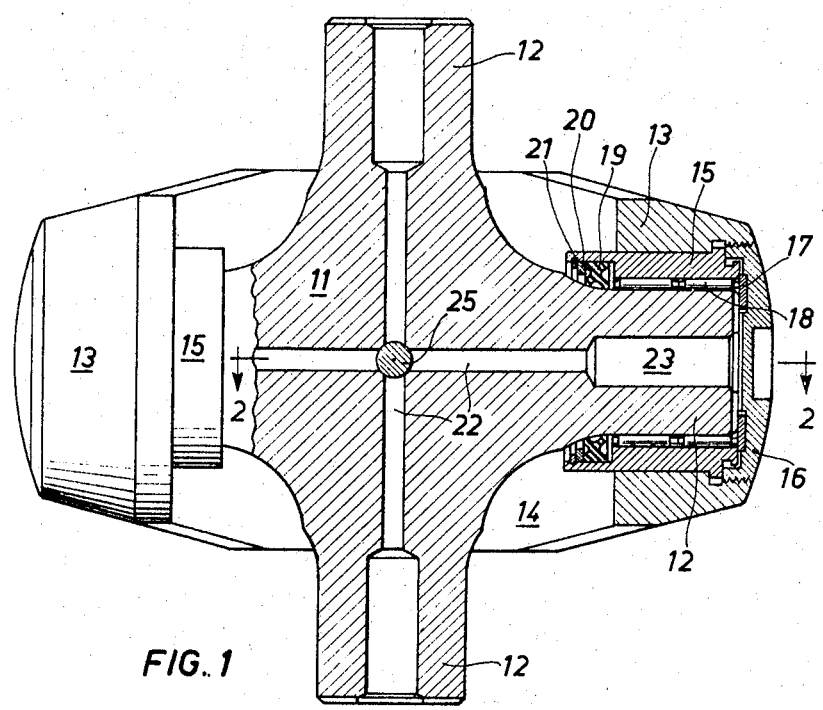

The present invention relates to a universal joint, and more particularly to a novel lubricating system for a universal joint.

The bearing places of universal joints for the transmission of high torques require an intensive lubrication by reason of the normally high bearing loads and the oscillating movements of the bearing parts only within a small angular range.

In most universal joints, bores are arranged in the cross assembly along the pin axes; these bores are connected with each other. Lubricant is supplied to these bores in predetermined periodic intervals at one place by way of a lubricating nipple from a lubricating gun or the like. The lubricant leaves the bore at the pin end face, thereby supplies the axial abutment surfaces of the pins or gudgeon and then reaches the pin bearing, properly speaking. The bearing bushings are provided for the most part at the end face thereof with a bottom or are tightly closed thereat by means of a cover, and the bearing between the bushing and the pin is sealed by means of a shaft seal at the open end of the bearing bushing. The seal is thereby intended to prevent the penetration of dirt and foreign particles into the bearing and to prevent the discharge of the lubricant out of the bearing. However, a complete sealing, apart from the fact that it can be realized only with great difficulty, is not desirable at this place as during lubrication the used lubricant in the bearing is to be squeezed out toward the outside by means of the newly supplied lubricant.

A centrifugal force acts on the lubricant supply with a rotating joint during operation thereof and as a result of the different heights of the lubricant columns, in the bearing from the pin end face to the sealing ring and in the supply bore from the pin end face to the joint center point, the lubricant is pressed through the seal toward the outside by the excess pressure. Particularly in joints of larger dimensions and with higher rotational speed it has been found that after a relatively short period of operation the entire lubricant supply is lost and the joint has to be re-lubricated at relatively short intervals. Thus, there exists the danger that the bearings are damaged by lack of lubricant.

During standstill after the first operation, the lubricant which has become thin by reason of the unavoidable heating of the joint, flows from those bores which are located in the given stopping position above the center point, into the bores disposed therebelow and again completely fills the same. During the next operation this excess is again squeezed out by the centrifugal force toward the outside. Lubricant is then forced by the centrifugal force out of the bearing each time into the bores that have now become empty. These operations repeat themselves during each successive cycle of "operation-standstill" until almost the entire lubricant has migrated or seeped through the sealing rings toward the outside.

In one known joint of the prior art, a lubricant storage space or supply space is arranged in the center of the cross and a lubricant space is arranged in each bearing pin. Spring-loaded valves are arranged between the supply space and the lubricant spaces which, both during lubrication and during the occurrence of the centrifugal forces as a result of rotation of the joint, permit lubricant to enter from the supply space into the lubricating spaces of the bearing pins.

These prior art valves prevent during standstill of the joint a back-flow of the lubricant out of the lubricating spaces of the bearing pins, however, with a rotating cross the lubricant from the supply space is able to displace the lubricant present in the lubricating spaces of the bearing pins toward the outside through the bearing seals. Additionally, the four valves of the prior art together with the valve seats involve considerable manufacturing expenditures.

The present invention creates a universal joint which prevents the return flow of the lubricant during standstill of the joint and avoids the aforementioned disadvantages of the prior art joints, by the arrangement of a closure valve within the cross-over point of the lubricant bores. The present invention essentially consists of a lubricant supply bore, preferably in the center axis of the pin cross, and of a piston which is adjusted by means of a spring into the closure position in which it closes the four lubricant bores with respect to each other.

Only during the first operation or rotation of the universal joint after a lubrication a slight amount of lubricant can leave through the sealing rings until the lubricant column in the bore has dropped to the height of the sealing ring. As a result of closing off the bores, the lubricant can no longer flow during standstill from one to the other bore so that the lubricant column in the bore can no longer exceed the height of the sealing ring. No excess pressure can occur any longer at the sealing ring and any further discharge of the lubricant through the sealing ring is prevented.

Accordingly, it is an object of the present invention to provide a universal joint of the type described above which avoids, by extremely simple and effective means, the aforementioned shortcomings and drawbacks encountered with the prior art constructions.

It is another object of the present invention to provide a universal joint which obviates the need for periodic lubrications at relatively short intervals.

A further object of the present invention resides in a universal joint of the type described above which effectively prevents the undesirable escape of lubricant during operation as a result of the effect of the centrifugal forces yet permits a squeezing out of the used lubricant when fresh lubricant is supplied during normal servicing lubrication by means of a pressure gun or the like.

Still a further object of the present invention resides in a universal joint that prevents the backflow of lubricant during standstill so that the height of the lubricant column is maintained essentially constant throughout each operating period with the same lubricant.

Figure 2:
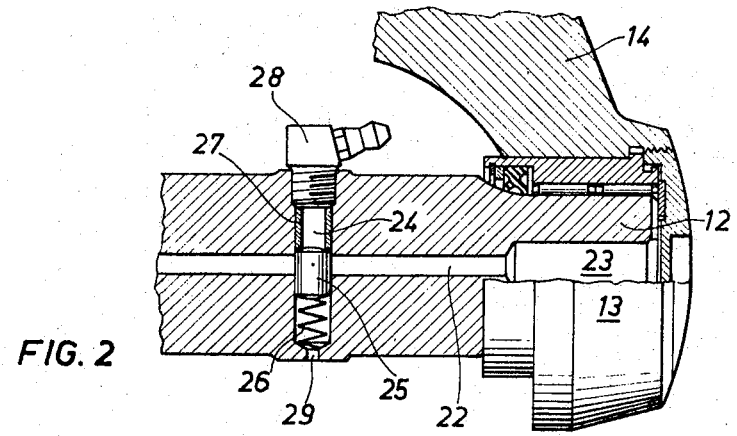

These and further objects, features, and advantages of the present invention will become more obvious from the following description when taken in connection with the accompanying drawing which shows, for purposes of illustration only, one embodiment in accordance with the present invention, and wherein:

FIGURE 1 is a cross-sectional view of a universal joint in accordance with the present invention, taken through the center plane of the cross, and FIGURE 2 is a partial cross-sectional view of the universal joint of FIGURE 1, rotated at 90° with respect to the cross section of FIGURE 1, the plane of the section extending through a pin or trunnion axis.

Referring now to the drawing, wherein like reference numerals are used throughout the two views to designate corresponding parts, reference numeral 11 generally designates a cross structure of a universal joint provided with bearing pins or gudgeons 12, as known broadly in the art. The universal joint cross 11 is supported with the bearing pins 12 thereof in bearing eyes 13 of joint forks 14. Bearing bushings 15 are pressed into the bearing eyes 13. The bearing bushings 15 are axially secured and closed against the outside by means of covers 16 threaded into the bearing eyes 13. The covers 16 have sliding surfaces 17 as axial abutment surfaces for the bearing pins 12. Bearing needles 18 are arranged between the bearing bushings 15 and the bearing pin running surfaces. Sealing rings 19 are seated at the open ends of the bearing spaces which rings 19 are retained axially in the bearing bushings 15 by thrust rings 20 and spring rings or lock washers 21.

Lubricating bores 22 are provided in the individual bearing pins within the cross 11, which bores 22 cross each other in the center of the cross and which are enlarged into lubricant supply spaces 23 from the pin end faces up to about the axial height of the sealing rings 19. A lubricating supply bore 24 extends through the cross-over point of the bores 22 perpendicularly to the latter within the center axis of the cross 11.

A piston 25 and the lubricating supply bore 24 form together a closure slide valve for closing the four lubricating bores 22 with respect to one another. The bottom of bore 24 serves as abutment for a spring 26 which presses the piston 25 against an abutment constituted by a pressed-in spacer bushing 27. A lubricating nipple 28 is threaded into the opening of the bore 24. A venting bore 29 leads from the bottom of the bore 24 toward the outside.

During lubrication of the cross 11, the lubricant is forced into the lubricating supply bore 24 through the lubricating nipple 28. As a result thereof, the piston 25 deflects in the downward direction against the spring force and releases or frees the connection of the lubricating supply bore 24 with the bores 22 so that the lubricant can enter into all four supply spaces 23 and into the pin bearings. After the lubrication is completed, the piston 25 is again forced into the closure position by the spring 26 and the lubricant supply bores 22 are thereby again closed with respect to one another.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. In a universal joint which includes a cross structure having bearing pin means, bearing support means for said bearing pin means, and bearing means between a respective pin means and a respective support means, the improvement comprising a lubricating system in said pin means for lubricating said bearing means including bore means in each pin means, lubricant supply bore means for supplying lubricant to said first-mentioned bore means, and a single closure valve means for closing said supply bore means with respect to the first-mentioned bore means as well as said first-mentioned bore means with respect to each other.

2. The combination according to claim 1, wherein said closure valve means includes a single spring-loaded piston member.

3. The combination according to claim 1, wherein said first-mentioned bore means intersect substantially in the center of said cross structure, and wherein said supply bore means interconnects with said bore means substantially at the point of intersection of said first-mentioned bore means.

4. The combination according to claim 3, wherein said first-mentioned bore means are provided with enlargements forming lubricant storage spaces, said enlargements extending from the free end of each bearing pin means inwardly.

References Cited

UNITED STATES PATENTS

| 1,968,787 | 7/1934 | Slaght et al. | 64—17 |
| 2,078,739 | 4/1937 | Slaght | 64—17 |
| 2,081,505 | 5/1937 | Padgett | 64—17 |
| 3,204,428 | 9/1965 | Stokely | 64—17 |

FOREIGN PATENTS 317,990  8/1929  Great Britain.

MILTON KAUFMAN, *Primary Examiner.*

HALL C. COE, *Examiner.*